US010279482B1

(12) United States Patent
Khripin et al.

(10) Patent No.: US 10,279,482 B1
(45) Date of Patent: May 7, 2019

(54) BRAKING AND REGENERATION CONTROL IN A LEGGED ROBOT

(71) Applicant: Boston Dynamics, Inc., Waltham, MA (US)

(72) Inventors: Alex Khripin, Waltham, MA (US); Stephen Berard, Waltham, MA (US); Alfred Anthony Rizzi, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 908 days.

(21) Appl. No.: 14/574,471

(22) Filed: Dec. 18, 2014

(51) Int. Cl.
B25J 9/20 (2006.01)
F15B 9/09 (2006.01)
B62D 57/032 (2006.01)
B25J 5/00 (2006.01)

(52) U.S. Cl.
CPC . B25J 9/20 (2013.01); B25J 5/00 (2013.01); B62D 57/032 (2013.01); F15B 9/09 (2013.01); Y10S 901/01 (2013.01)

(58) Field of Classification Search
CPC ... F15B 11/028; F15B 9/09; B25J 9/20; B25J 5/00; B62D 57/032
See application file for complete search history.

(56) References Cited

U.S. PATENT DOCUMENTS

| 8,626,326 | B1 | 1/2014 | Theobald et al. | |
| 8,734,123 | B2 | 5/2014 | Alfayad et al. | |
| 8,840,118 | B1 | 9/2014 | Giovanardi et al. | |
| 2004/0076502 | A1* | 4/2004 | Nissing | B66C 13/066 414/699 |
| 2012/0291873 | A1* | 11/2012 | Potter | F15B 11/028 137/12 |

* cited by examiner

Primary Examiner — Michael Leslie
Assistant Examiner — Abiy Teka
(74) Attorney, Agent, or Firm — Honigman Miller Schwartz and Cohn LLP

(57) ABSTRACT

An example robot includes a hydraulic actuator cylinder controlling motion of a member of the robot. The hydraulic actuator cylinder comprises a piston, a first chamber, and a second chamber. A valve system controls hydraulic fluid flow between a hydraulic supply line of pressurized hydraulic fluid, the first and second chambers, and a return line. A controller may provide a first signal to the valve system so as to begin moving the piston based on a trajectory comprising moving in a forward direction, stopping, and moving in a reverse direction. The controller may provide a second signal to the valve system so as to cause the piston to override the trajectory as it moves in the forward direction and stop at a given position, and then provide a third signal to the valve system so as to resume moving the piston in the reverse direction based on the trajectory.

18 Claims, 14 Drawing Sheets

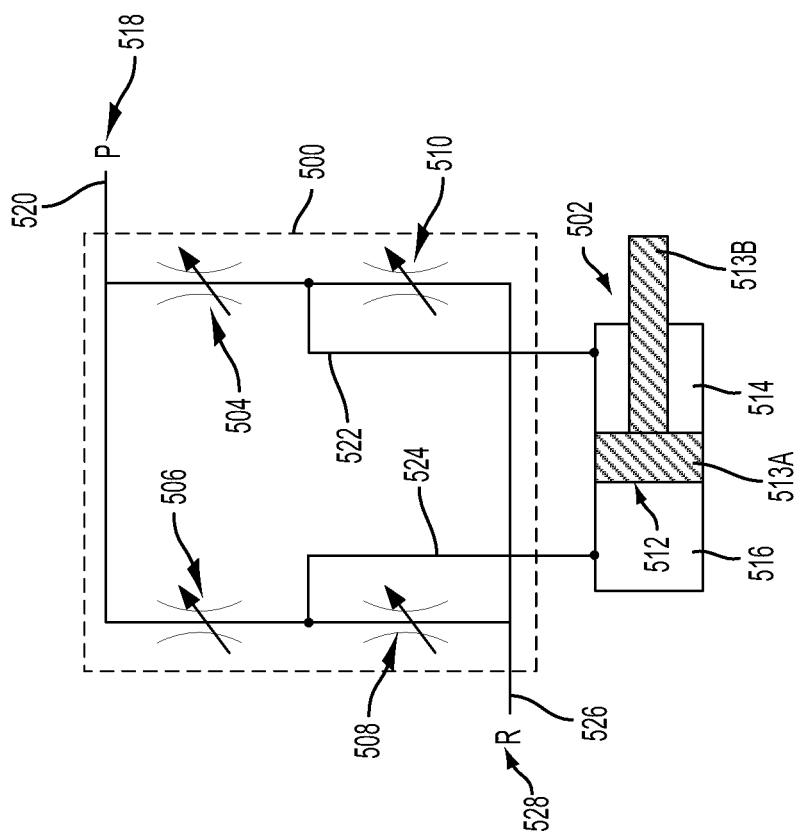

US 10,279,482 B1

BRAKING AND REGENERATION CONTROL IN A LEGGED ROBOT

GOVERNMENT LICENSE RIGHTS

This invention was made with government support under Contract No. W91CRB-11-C-0048 awarded by the Defense Advanced Research Projects Agency. The government has certain rights in the invention.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic devices operate is becoming more intelligent, efficient, and intuitive. As robotic systems become increasingly prevalent in numerous aspects of modern life, the desire for efficient robotic systems becomes apparent. Therefore, a demand for efficient robotic systems has helped open up a field of innovation in actuators, movement, sensing techniques, as well as component design and assembly.

SUMMARY

The present disclosure describes implementations that relate to braking and regeneration control. In a first example implementation, the present disclosure describes a robot. The robot includes a hydraulic actuator cylinder controlling motion of a member of the robot, where the hydraulic actuator cylinder comprises a piston, a first chamber, and a second chamber. The robot also includes a valve system configured to control hydraulic fluid flow between a supply line of pressurized hydraulic fluid, the first and second chambers, and a return line. The robot further includes a controller configured to: (i) provide a first signal to the valve system so as to move the piston based on a trajectory, where the trajectory indicates that the piston should move in a forward direction from a first position until the piston stops at a second position, then move in a reverse direction, (ii) when the piston is between the first position and the second position while moving in the forward direction, provide a second signal to the valve system so as to cause the piston to override the trajectory and stop at a third position disposed between the first position and the second position, and (iii) prior to when the piston would have reached the third position if the piston was moving in the reverse direction according to the trajectory, provide a third signal to the valve system so as to resume moving the piston in the reverse direction based on the trajectory.

In a second example implementation, the present disclosure describes performing the following operations: (i) providing, by a controller of a robot, a first signal to a valve system, wherein the robot includes a hydraulic actuator cylinder controlling motion of a member of the robot, where the hydraulic actuator cylinder comprises a piston, a first chamber, and a second chamber, where the valve system is configured to control hydraulic fluid flow between a supply line of pressurized hydraulic fluid, the first and second chambers, and a return line, where the first signal to the valve system causes the piston to move the piston based on a trajectory, where the trajectory indicates that the piston should move in a forward direction from a first position until the piston stops at a second position, then move in a reverse direction, (ii) when the piston is between the first position and the second position while moving in the forward direction, provide a second signal to the valve system so as to cause the piston to override the trajectory and stop at a third position disposed between the first position and the second position, and (iii) prior to when the piston would have reached the third position if the piston was moving in the reverse direction according to the trajectory, provide a third signal to the valve system so as to resume moving the piston in the reverse direction based on the trajectory.

In a third example implementation, the present disclosure describes a non-transitory computer readable medium having stored therein instructions that, when executed by a controller of a robot, cause the controller to perform operations in accordance with the second example implementation.

A fourth example implementation may include a system having means for performing operations in accordance with the second example implementation.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIG. 5 illustrates a hydraulic circuit having a valve system for controlling a hydraulic actuator cylinder, in accordance with an example implementation.

DETAILED DESCRIPTION

The following detailed description describes various features and functions of the disclosed systems and methods with reference to the accompanying figures. The illustrative system and method implementations described herein are not meant to be limiting. It may be readily understood that certain aspects of the disclosed systems and methods can be arranged and combined in a wide variety of different configurations, all of which are contemplated herein.

I. INTRODUCTION

A controller of a robot may be configured to cause the robot to move about on its legs or be in a stance position while maintaining its balance. An example robot may be a biped robot having two legs, or a quadruped robot having four legs, among other possibilities. The controller may be configured to enable the robot to stand, walk, trot, or run in a given direction. The controller may be a computing system, including a central processing unit and a memory, a special-purpose computer, or a digital logic.

A leg of an example robot may have several members or links. Hydraulic actuators may be configured to control motion of such members. As the robot moves (e.g., gallops), the leg may go through cycles. For instance, a given cycle may include several phases such as the leg lifting off from the ground, swinging backward, stopping, reversing direction to swing forward and touching down on the ground to repeat the cycle. A hydraulic actuator cylinder that controls the leg, or a member of the leg, may also go through corresponding phases in a cycle. For example, the hydraulic actuator cylinder may retract, slow down and stop, then reverse direction to extend.

An efficient hydraulic system may be configured to avoid consuming hydraulic power during portions of a cycle where the hydraulic actuator cylinder exerts a negative work, i.e., when the actuator is moving in the opposite direction of the desired force. As an example, when a robot is moving downwards towards the ground, the robot uses a leg to push against the ground such that the hydraulic actuator cylinder controlling the leg absorbs the energy of the robot's body. As another example, the robot may accelerate a limb through space while galloping, and may want to slow the limb down to bring it to rest such that the actuator controlling the limb absorbs the kinetic energy of the limb. In such situations, the controller of the robot may be configured to control the hydraulic system in an efficient manner to avoid using high pressure fluid from a supply source, and may further regenerate energy into the fluid supply source so as to add energy to the system instead of consuming energy.

II. EXAMPLE ROBOTIC SYSTEM

Figure 1:
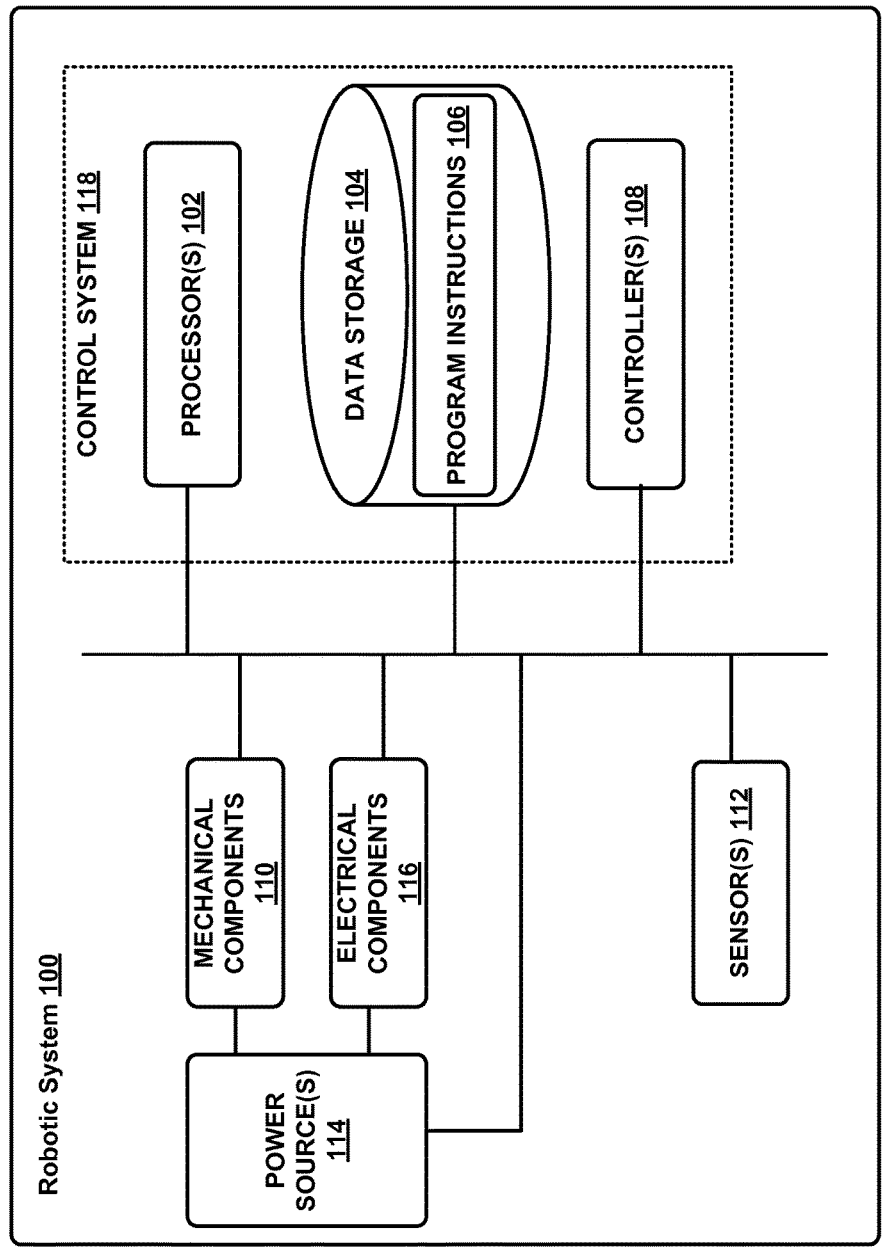
FIG. 1 illustrates a configuration of a robotic system, in accordance with an example implementation.

Referring now to the figures, FIG. 1 illustrates an example configuration of a robotic system, in accordance with an example implementation. The robotic system 100 represents an example robotic system configured to perform the implementations described herein. Additionally, the robotic system 100 may be configured to operate autonomously, semi-autonomously, and/or using directions provided by user(s), and may exist in various forms, such as a biped robot or a quadruped robot, among other examples. Furthermore, the robotic system 100 may also be referred to as a robotic device, mobile robot, or robot, among other designations.

As shown in FIG. 1, the robotic system 100 may include processor(s) 102, data storage 104, program instructions 106, and controller(s) 108, which together may be part of a control system 118. The robotic system 100 may also include sensor(s) 112, power source(s) 114, mechanical components 110, and electrical components 116. Note that the robotic system 100 is shown for illustration purposes, and may include more or less components within various examples. The components of robotic system 100 may be connected in any manner, including wired or wireless connections, etc. Further, in some examples, components of the robotic system 100 may be positioned on multiple entities rather than a single entity. Other example illustrations of robotic system 100 may exist.

Processor(s) 102 may operate as one or more general-purpose processors or special purpose processors (e.g., digital signal processors, application specific integrated circuits, etc.). The processor(s) 102 may be configured to execute computer-readable program instructions 106 that are stored in the data storage 104 and are executable to provide the operations of the robotic system 100 described herein. For instance, the program instructions 106 may be executable to provide functionality of controller(s) 108, where the controller(s) 108 may be configured to control the mechanical components 110 and the electrical components 116.

The data storage 104 may exist as various types of storage configured to hold information or instructions. For example, the data storage 104 may include or take the form of one or more computer-readable storage media that can be read or accessed by processor(s) 102. The one or more computer-readable storage media can include volatile and/or non-volatile storage components, such as electrical, optical, magnetic, organic or other memory or disc storage, which can be integrated in whole or in part with processor(s) 102. In some implementations, the data storage 104 can be implemented using a single physical device (e.g., one electrical, optical, magnetic, organic or other memory or disc storage unit), while in other implementations, the data storage 104 can be implemented using two or more physical devices, which may communicate via wired or wireless communication. Further, in addition to the computer-readable program instructions 106, the data storage 104 may include additional data such as diagnostic data, configuration data, sensor data, environmental data, among other possibilities.

The control system 118 may include at least one controller 108, which may interface with the robotic system 100. The controller 108 may serve as a link between portions of the robotic system 100, such as a link between, the control system 118, mechanical components 110 and/or electrical components 116. In some instances, the controller 108 may serve as an interface between the control system 118 and another computing device. Further, the controller 108 may serve as an interface between the robotic system 100 and a user(s). In these cases, the controller 108 may include various components for communicating with other components of the robotic system 100, including a joystick(s), buttons, among others. The example interfaces and communications noted above may be implemented via a wired or wireless connection, or both. The controller 108 may perform other functions for the robotic system 100 as well. Other examples of controllers may exist.

The mechanical components 110 represent possible hardware of the robotic system 100 that may enable the robotic system 100 to perform physical operations. As a few examples, the robotic system 100 may include actuator(s), extendable leg(s) ("legs"), arm(s), wheel(s), one or more structured bodies for housing the control system 118, the electrical components 116, the power source 114, the sensors 112, and other mechanical components. The mechanical components 110 may depend on the design of the robotic system 100 and may also be based on the functions and/or tasks the robotic system 100 may be configured to perform.

As such, depending on the operation and functions of the robotic system 100, different mechanical components 110 may be available for the robotic system 100 to utilize. In some examples, the robotic system 100 may be configured to add and/or remove mechanical components 110, which may involve assistance from a user and/or other robot. For example, the robotic system 100 may be initially configured with four legs, but may be altered by a user or the robotic system 100 to remove two of the four legs to operate as a biped. Other examples of mechanical components 110 may be included within some implementations.

Additionally, the robotic system 100 may include one or more sensor(s) 112 arranged to sense aspects of the robotic system 100. The sensor(s) 112 may include one or more force sensors arranged to measure load on various components of the robotic system 100. In an example, the sensor(s) 112 may include one or more force sensors on each leg. Such force sensors on the legs may measure the load on the actuators that move one or more members of the legs.

The sensor(s) 112 may further include one or more position sensors. Position sensors may sense the position of the actuators of the robotic system. In one implementation, position sensors may sense the extension, retraction, or rotation of the actuators on the legs of the robot. The sensor(s) 112 may further include one or more velocity and/or acceleration sensors. For instance, the sensor(s) 112 may include an inertial measurement unit (IMU). The IMU may sense velocity and acceleration in the world frame, with respect to the gravity vector. The velocity and acceleration of the IMU may then be translated to the robotic system, based on the location of the IMU in the robotic system and the kinematics of the robotic system. Other sensor(s) 112 are also possible, including proximity sensors, motion sensors, load sensors, touch sensors, depth sensors, ultrasonic range sensors, and infrared sensors, among other possibilities.

The sensor(s) 112 may provide sensor data to the processor(s) 102 to allow for appropriate interaction of the robotic system 100 with the environment as well as monitoring of operation of the systems of the robotic system 100. The sensor data may be used in evaluation of various factors for activation and deactivation of mechanical components 110 and electrical components 116 by controller 108 and/or a computing system of the robotic system 100.

The sensor(s) 112 may provide information indicative of the environment of the robot for the controller 108 and/or computing system to use to determine operations for the robotic system 100. For example, the sensor(s) 112 may capture data corresponding to the terrain of the environment or location of nearby objects, which may assist with environment recognition and navigation, etc. In an example configuration, the robotic system 100 may include a sensor system that includes a radio detection and ranging (RADAR) device, a light detection and ranging (LIDAR) device, a Sound Navigation and Ranging (SONAR) device, one or more cameras, a global positioning system (GPS) transceiver, and/or other sensors for capturing information of the environment of the robotic system 100. The sensor(s) 112 may monitor the environment in real-time and detect obstacles, elements of the terrain, weather conditions, temperature, and/or other parameters of the environment for the robotic system 100.

Further, the robotic system 100 may include other sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The sensor data provided by the sensors may enable the robotic system 100 to determine errors in operation as well as monitor overall functioning of components of the robotic system 100. For example, the control system 118 may use sensor data to determine a stability of the robotic system 100 during operations as well as measurements related to power levels, communication activities, components that require repair, among other information. As an example configuration, the robotic system 100 may include gyroscope(s), accelerometer(s), and/or other possible sensors to provide sensor data relating to the state of operation of the robot. Further, sensor(s) 112 may also monitor the current state of a function, such as a gait, that the robotic system 100 may currently be operating. Other example uses for the sensor(s) 112 may exist as well.

Additionally, the robotic system 100 may also include one or more power source(s) 114 configured to supply power to various components of the robotic system 100. Among possible power systems, the robotic system 100 may include a hydraulic system, electrical system, batteries, and/or other types of power systems. As an example illustration, the robotic system 100 may include one or more batteries configured to provide charge to components that may receive charge via a wired and/or wireless connection. Within examples, components of the mechanical components 110 and electrical components 116 may each connect to a different power source or may be powered by the same power source. Components of the robotic system 100 may connect to multiple power sources 114 as well.

Within example configurations, any type of power source may be used to power the robotic system 100, such as a gasoline engine. Further, the power source(s) 114 may charge using various types of charging, such as wired connections to an outside power source, wireless charging, combustion, or other examples. Additionally, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system of the robotic system 100 may transfer a large amount of power through small tubes, flexible hoses, or other links between components of the robotic system 100. Such a hydraulic system may include pressure sources such as hydraulic pump(s) in addition to reservoirs or tank. In examples where the robotic system 100 includes a hydraulic system, the sensor(s) 112 may include pressure sensors configured to measure pressure level of hydraulic fluid at various parts of the hydraulic systems. Other power sources may be included within the robotic system 100.

The electrical components 116 may include various components capable of processing, transferring, providing electrical charge or electric signals, for example. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various functions. The electrical components 116 may be configured to provide power from the power source(s) 114 to the various mechanical components 110, for example. Further, the robotic system 100 may include electric motors. Other examples of electrical components 116 may exist as well.

Figure 2:
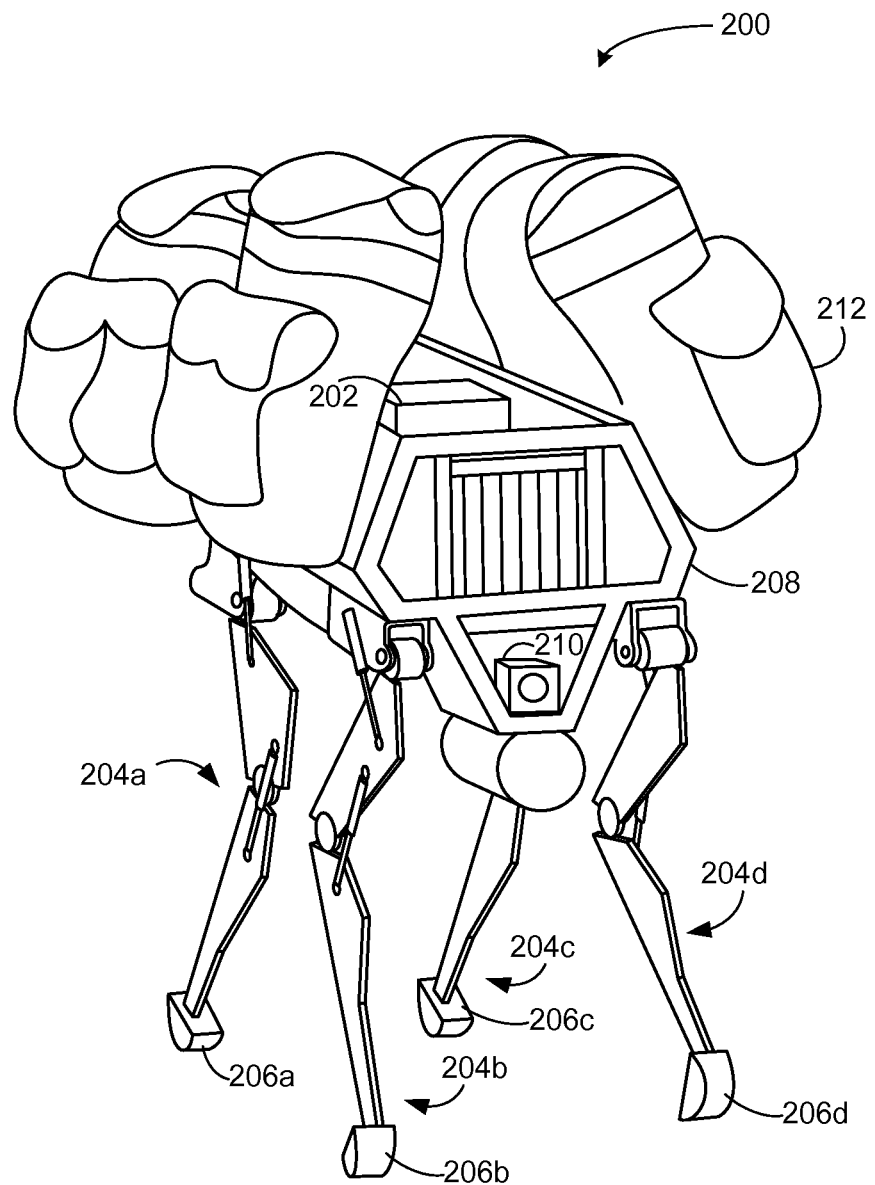
FIG. 2 illustrates a quadruped robot, in accordance with an example implementation.

FIG. 2 illustrates an example quadruped robot 200, according to an example implementation. Among other possible operations, the robot 200 may be configured to perform some of the features described herein during operation. The robot 200 includes a control system 202, and legs 204a, 204b, 204c, 204d connected to a body 208. Each leg may include a respective foot 206a, 206b, 206c, 206d that may contact the ground surface. The robot 200 may also include sensors (e.g., sensor 210) configured to provide sensor data to the control system 202 of the robot 200. Further, the robot 200 is illustrated carrying a load 212 on the body 208. Within other example implementations, the robot 200 may include more or less components and may additionally include components not shown in FIG. 2.

The robot 200 may be a physical representation of the robotic system 100 shown in FIG. 1 or may be based on other configurations. Thus, the robot 200 may include some or all of the modules and capabilities discussed in the context of FIG. 1. For instance, the control system 202 of the robot 200 may be the control system 118 or other types of controls systems. The control system 202 may include a computing system that may be made up of one or more computing devices configured to assist in various operations of the robot 200, which may include processing data and providing outputs based on the data. The control system 202 may process information provided by various systems of the robot 200 (e.g., a sensor system) or from other sources (e.g., a user, another robot, a server) and may provide instructions to the systems to operate in response.

Additionally, the control system 202 may monitor systems of the robot 200 during operation, to determine errors and/or monitor regular operation, for example. In some example configurations, the control system 202 may serve as a connection between the various systems of the robot 200 that coordinates the operations of the systems together to enable the robot 200 to perform operations. Further, although the operations described herein correspond to the control system 202 of a robot performing tasks, the control system 202 may be made of multiple devices, processors, controllers, and/or other entities configured to assist in the operation of the robot. Additionally, the control system 202 may operate using various types of memory and/or other components.

Although the robot 200 includes four legs 204a-204d in the illustration shown in FIG. 2, the robot 200 may include more or less legs within other examples. Further, the configuration, position, and/or structure of the legs 204a-204d may vary in example implementations. The legs 204a-204d enable the robot 200 to move and may be configured to operate in multiple degrees of freedom to enable different techniques of travel to be performed. In particular, the legs 204a-204d may enable the robot 200 to travel at various speeds through mechanically controlling the legs 204a-204d according to the mechanics set forth within different gaits. A gait is a pattern of movement of the limbs of an animal, robot, or other mechanical structure. As such, the robot 200 may navigate by operating the legs 204a-204d to perform various gaits. The robot 200 may use one or more gaits to travel within an environment, which may involve selecting a gait based on speed, terrain, the need to maneuver, and/or energy efficiency.

Further, different types of robots may use different gaits due to differences in design that may prevent use of certain gaits. Although some gaits may have specific names (e.g., walk, trot, run, bound, gallop, etc.), the distinctions between gaits may overlap.

One or more systems of the robot 200, such as the control system 202, may be configured to operate the legs 204a-204d to cause the robot 200 to move. Additionally, the robot 200 may include other mechanical components, which may be attached to the robot 200 at various positions. The robot 200 may include mechanical arms, grippers, or other features. In some examples, the legs 204a-204d may have other types of mechanical features that enable control upon various types of surfaces that the robot may encounter, such as wheels, etc. Other possibilities also exist.

As part of the design of the example robot 200, the body 208 of the robot 200 connects to the legs 204a-204d and may house various components of the robot 200. As such, the structure of the body 208 may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body 208 as well as the legs 204a-204d may be developed using various types of materials, such as various metals or plastics. Within other examples, a robot may have a body with a different structure or made of other types of materials.

The sensor(s) 210 of the robot 200 may include various types of sensors, such as the camera or sensing system shown in FIG. 2. The sensor(s) 210 may be similar to the sensors 112, and are positioned on the front of the body 208, but may be placed at other positions of the robot as well. As described for the robotic system 100, the robot 200 may include a sensory system that includes force sensors, position sensors, fluid pressure sensors, IMUs, RADAR, LIDAR, SONAR, GPS, accelerometer(s), gyroscope(s), and/or other types of sensors. The sensor(s) 210 may be configured to measure parameters of the environment of the robot 200 as well as monitor internal operations of systems of the robot 200. As an example illustration, the robot 200 may include sensors that monitor the accuracy of its systems to enable the computing system to detect a system within the robot 200 that may be operating incorrectly. Other uses of the sensor(s) 210 may be included within examples.

The load 212 carried by the robot 200 may represent various types of cargo that the robot 200 may transport. The load 212 may also represent external batteries or other types of power sources (e.g., solar panels) that the robot 200 may utilize. The load 212 represents one example use for which the robot 200 may be configured. The robot 200 may be configured to perform other operations as well.

Additionally, as shown with the robotic system 100, the robot 200 may also include various electrical components that may enable operation and communication between the mechanical features of the robot 200. Also, the robot 200 may include one or more computing systems that include controllers and one or more processors configured to perform various operations, including processing inputs to provide control over the operation of the robot 200. The computing system may include additional components, such as various types of storage and a power source, etc.

During operation, the computing system may communicate with other systems of the robot 200 via wired or wireless connections and may further be configured to communicate with one or more users of the robot 200. As one possible illustration, the computing system may receive an input from a user indicating that the user wants the robot to perform a particular gait in a given direction. The computing system may process the input and may perform an operation that may cause the systems of the robot 200 to perform the requested gait. Additionally, the robot's electrical components may include interfaces, wires, busses, and/or other communication links configured to enable systems of the robot 200 to communicate.

Furthermore, the robot 200 may communicate with one or more users and/or other robots via various types of interfaces. In an example implementation, the robot 200 may receive input from a user via a joystick or similar type of interface. The computing system may be configured to measure the amount of force and other possible information from inputs received from a joystick interface. Similarly, the robot 200 may receive inputs and communicate with a user via other types of interfaces, such as a mobile device or a microphone. The computing system of the robot 200 may be configured to process various types of inputs.

Figure 3:
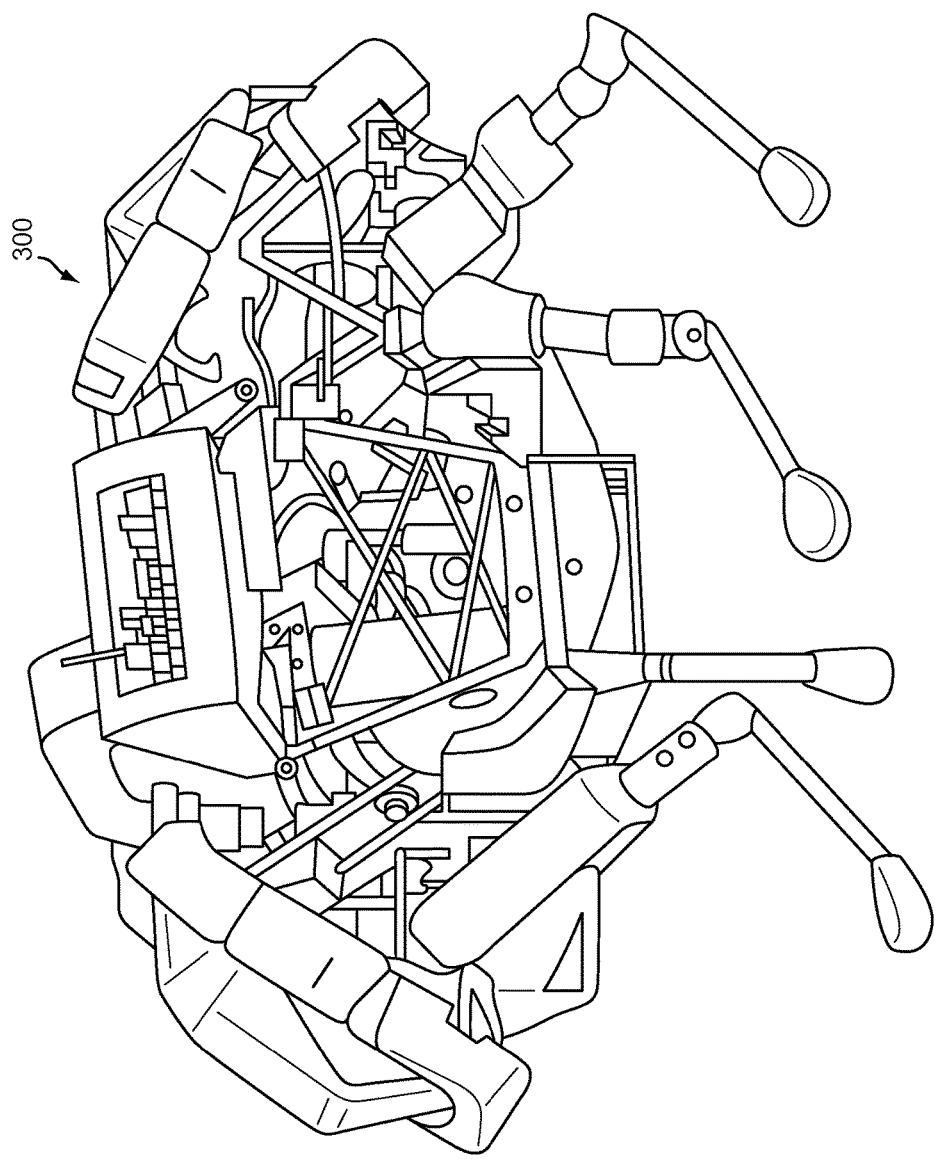
FIG. 3 illustrates another quadruped robot, in accordance with an example implementation.

FIG. 3 illustrates another quadruped robot 300 according to an example implementation. Similar to robot 200 shown in FIG. 2, the robot 300 may correspond to the robotic system 100 shown in FIG. 1. The robot 300 serves as another possible example of a robot that may be configured to perform some of the implementations described herein.

Figure 4:
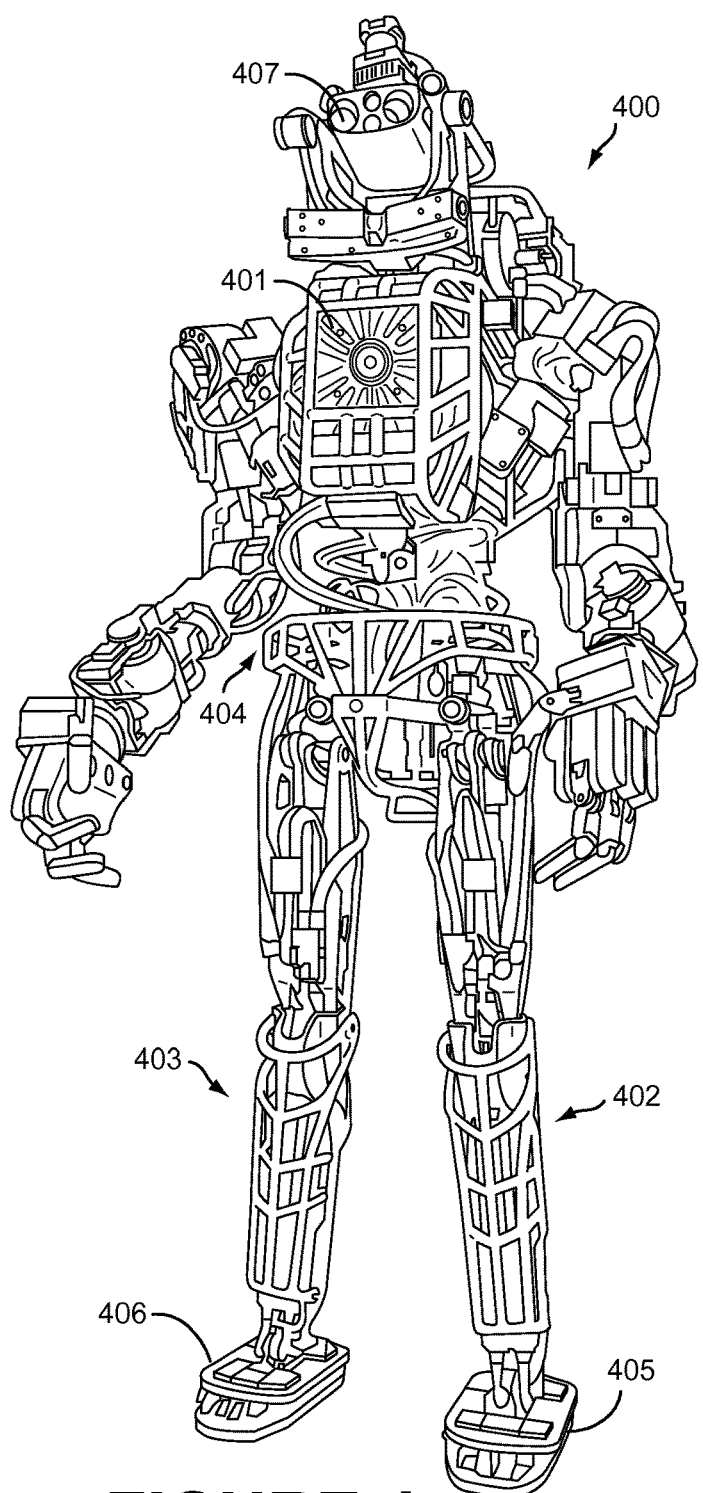
FIG. 4 illustrates a biped robot, in accordance with an example implementation.

FIG. 4 illustrates a biped robot 400 according to another example implementation. Similar to robots 200 and 300 shown in FIGS. 2 and 3, the robot 400 may correspond to the robotic system 100 shown in FIG. 1, and may be configured to perform some of the implementations described herein. The robot 400 may include more or less components than those shown in FIG. 2 and discussed with respect to the robot 200. For example, the robot 400 may include a control system 401 and legs 402, 403 connected to a body 404. Each leg may include a respective foot 405, 406, that may contact the ground surface. The robot 400 may also include sensors (e.g., sensor 407) configured to provide sensor data to the control system 401 of the robot 400.

III. EXAMPLE HYDRAULIC SYSTEM FOR EFFICIENT CONTROL OF AN ACTUATOR

FIG. 5 illustrates a hydraulic circuit having a valve system 500 for controlling a hydraulic actuator cylinder 502, in accordance with an example implementation. The hydraulic actuator cylinder 502 may be configured to control motion of a member of robot such as any of the robots discussed above. The valve system 500 includes at least four variable orifices 504, 506, 508, and 510. A controller of the robot, such as the controller 108, may be configured to partially open, fully open, or close each of the orifices 504, 506, 508, and 510 by way of respective actuators (e.g., electric actuators such as solenoids, or hydraulic actuators). The hydraulic actuator cylinder 502 includes a piston 512 slidably accommodated in the hydraulic actuator cylinder 502. The piston 512 includes a piston head 513A and a rod 513B extending from the piston head 513A along a central axis direction of the hydraulic actuator cylinder 502. The inside of the hydraulic actuator cylinder 502 is divided into a first chamber 514 and a second chamber 516 by the piston head 513A. The controller may have access to sensor information from pressure sensors, such as sensor(s) 112, configured to measure pressure levels in the chamber 514 and chamber 516.

In an example, if motion of a robot member controlled by hydraulic actuator cylinder 502 requires retracting the piston 512 (moving the piston 512 to the left in Figures), the controller may open the orifice 504 and the orifice 508, and close the orifice 506 and the orifice 510 to block flow therethrough. In such configuration, hydraulic fluid flows from a pressure source 518 through a hydraulic supply line 520 and the orifice 504. The hydraulic fluid then flows through a hydraulic line 522 to the chamber 514 because the orifice 510 is closed. Hydraulic fluid flows into the chamber 514 and pushes against the piston head 513A of the piston 512, causes the piston 512 to retract (move left), and causes the chamber 514 to expand. Refraction of the piston 512 causes the chamber 516 to contract, and forces hydraulic fluid out from the chamber 516 through a hydraulic line 524 and the orifice 508, because the orifice 506 is closed, through a hydraulic return line 526 to a low pressure reservoir 528.

The pressure source 518 may contain pressurized fluid, and the reservoir 528 fluid may have lower pressure than that of the pressurized fluid of the pressure source 518. As an example for illustration, the pressure source 518 may be a pump driven by a motor or an engine and configured to supply hydraulic fluid at a pressure of 3000 pounds per square inch (psi), and the reservoir 528 may include hydraulic fluid at a pressure of 100 psi. These pressure levels are examples only, and other pressure levels are contemplated as well.

On the other hand, if motion of the robot member controlled by hydraulic actuator cylinder 502 requires extending the piston 512, the controller may open the orifice 506 and the orifice 510, and close the orifice 504 and the orifice 508 to block flow therethrough. In such configuration, hydraulic fluid flows from the pressure source 518 through the hydraulic supply line 520, the orifice 506, and the hydraulic line 524, because the orifice 508 is closed, to the chamber 516. Hydraulic fluid flow into the chamber 516 pushes against the piston head 513A of piston 512, causes the piston 512 to extend (move right in FIG. 1), and causes the chamber 516 to expand. Extension of the piston 512 causes the chamber 514 to contract, and forces hydraulic fluid out from the chamber 514 through the hydraulic line 522 and the orifice 510, because the orifice 504 is closed, through the hydraulic return line 526 to the reservoir 528.

Further, the valve system 500 allows for energy efficient control of hydraulic actuator cylinder 502 when hydraulic actuator cylinder 502 operates in a negative energy situation. For instance, assume that during a cycle of motion of a member of robot controlled by the hydraulic actuator cylinder 502, the piston 512 should extend, slow down its extension speed to stop, and reverse direction to retract. During the slowdown phase, the controller is configured to control the valve system 500 to slow down extension speed of the piston 512 to ultimately stop the piston 512. For example, based at least on the pressure level of hydraulic fluid in the chamber 514 and motion characteristics of the piston 512 (e.g., speed of the piston 512, acceleration/deceleration of the piston 512, position tracking error, etc.), the controller may open the orifice 504 and the orifice 508, while closing the orifice 506 and the orifice 510. In this manner, fluid in the chamber 514 is regenerated into the hydraulic supply line 520 via the hydraulic line 522 and the orifice 504. Fluid may also be drawn from the hydraulic return line 526 through the hydraulic line 524 and the orifice 508 into the chamber 516 to prevent cavitation of the chamber 516 (i.e., to prevent pressure in the chamber 516 to drop below a particular threshold pressure). Thus, kinetic energy of the piston 512 is used to push high pressure fluid of the chamber 514 into the hydraulic supply line 520 through the orifice 504, and no fluid is consumed from the hydraulic supply line 520. The piston 512 slows down and stops due to dissipation of its kinetic energy through pushing fluid of the chamber 514 through the orifice 504 into the hydraulic supply line 520.

Alternatively, based on the pressure level in the chamber 514 and the motion characteristics of the piston 512, the controller may open the orifice 510 and the orifice 508, while closing the orifice 506 and the orifice 504. In this manner, fluid in the chamber 514 flows through the hydraulic line 522 and the orifice 510 to the hydraulic return line 526. Fluid may also be drawn from the hydraulic return line 526 through the orifice 508 and the hydraulic line 524 into the chamber 516 to prevent cavitation of the chamber 516. Here also, no fluid is consumed from the hydraulic supply line 520 as the piston 512 slows down and stops.

As indicated above, the controller may choose whether to open the orifice 504 and the orifice 510, or open the orifice 510 and the orifice 508 based on the pressure level in the chamber 514 and the motion characteristics of the piston 512. In examples, the controller may choose whether to open the orifice 504 and the orifice 510, or open the orifice 510 and the orifice 508 based on a desired behavior of the hydraulic system, i.e., whether to regenerate fluid into the hydraulic supply line 520 or the hydraulic return line 526.

Power dissipation across an orifice can be determined by the following equation:

$$\text{Power} = Q \cdot \Delta P \qquad (1)$$

where Q is flow rate of hydraulic fluid through the orifice and $\Delta P$ is a pressure difference (i.e., pressure drop) across the orifice. For instance, during the phase where the piston 512 is slowing down and fluid is pushed through the orifice 504 into the hydraulic supply line 520, $\Delta P$ across the orifice 504 is equal to pressure difference between pressure in the chamber 514 and pressure in the hydraulic supply line 520 (assuming no other losses in hydraulic lines). Thus, as the piston 512 moves and pushes fluid through the orifice 504 into the hydraulic supply line 520, the piston's kinetic energy is dissipated and the piston 512 ultimately stops.

IV. EXAMPLE VALVE SYSTEMS

Figure 6B:
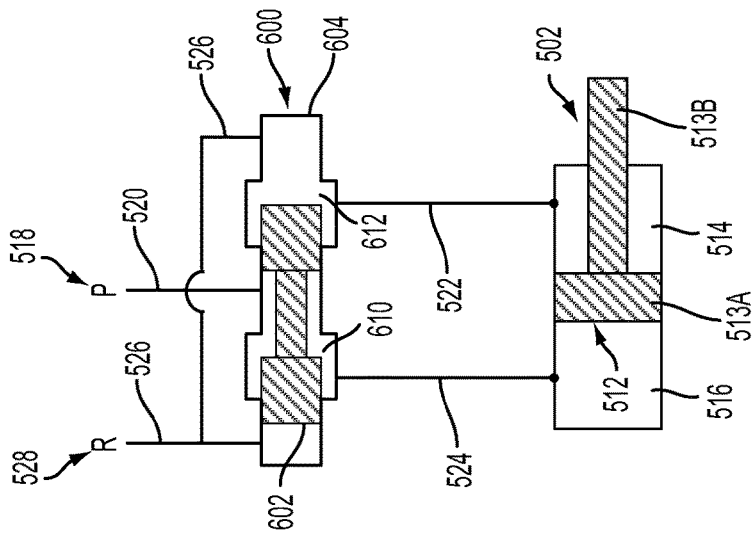
FIGS. 6A-6B illustrate a hydraulic circuit including a valve having a spool configured to move linearly, in accordance with an example implementation.
Figure 6A:
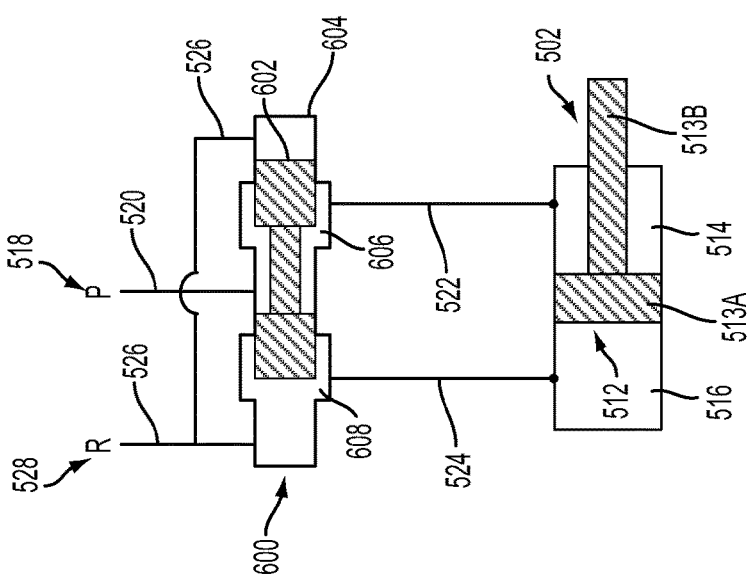

Several valve configurations can be used to realize or implement the valve system 500. FIGS. 6A-6B illustrate a hydraulic circuit including a four-way spool valve 600 having a spool 602 configured to move linearly, in accordance with an example implementation. FIGS. 6A-6B illustrate an example valve configuration that can be used to implement the valve system 500. The spool valve 600 can be an electrically operated valve that controls how hydraulic fluid is communicated to and from the hydraulic actuator cylinder 502.

The spool 602 is slidably accommodated within a valve body 604 of the valve 600. An electric solenoid, a stepper motor, a hydraulic actuator, or any other actuation device may be used for moving the spool 602 within the valve body 604. Axial position of the spool 602 controls hydraulic fluid flow from the pressure source 518 through the hydraulic supply line 520 to one of the two chambers 514 and 516, and controls flow of hydraulic fluid forced out from the other chamber to the low pressure reservoir 528 through the hydraulic return line 526.

As shown in FIG. 6A, the spool 602 is shifted to a given linear position so as to allow hydraulic fluid flow from the pressure source 518 through the hydraulic supply line 520, an opening 606, and the hydraulic line 522 to the chamber 514. Such high pressure fluid flow into the chamber 514 pushes against the piston head 513A of the piston 512, causes the piston 512 to retract (move left), and causes the chamber 514 to expand. Retraction of the piston 512 causes the chamber 516 to contract, and forces hydraulic fluid out from the chamber 516 through the hydraulic line 524 and an opening 608 to flow through the hydraulic return line 526 to the reservoir 528. In this manner, the opening 606 corresponds to the orifice 504 of the valve system 500, and the opening 608 corresponds to the orifice 508 of the valve system 500.

The valve 600 can also operate in a regenerative mode when hydraulic actuator cylinder 502 operates in a negative energy situation. For example, the piston 512 may be extending, but the controller seeks to slow the piston 512 down to ultimately stop it. In this example, fluid in the chamber 514 may be regenerated into the hydraulic supply line 520 via the hydraulic line 522 and the opening 606. Fluid may also be drawn from the hydraulic return line 526 through the opening 608 and the hydraulic line 524 into the chamber 516 to prevent cavitation of the chamber 516.

The spool 602 can be shifted to a different linear position, as shown in FIG. 6B, so as to allow hydraulic fluid flow from the pressure source 518 through the hydraulic supply line 520, an opening 610, and the hydraulic line 524 to the chamber 516. Flow into the chamber 516 pushes against the piston head 513A of the piston 512, causes the piston 512 to extend (move right), and causes the chamber 516 to expand. Extension of the piston 512 causes the chamber 514 to contract, and forces hydraulic fluid out from the chamber 514 through the hydraulic line 522 and an opening 612 to flow through the hydraulic return line 526 to the reservoir 528. In this manner, the opening 610 corresponds to the orifice 506 of the valve system 500, and the opening 612 corresponds to the orifice 510 of the valve system 500.

The valve 600 can also operate in a regenerative mode when the spool 602 is in the position shown in FIG. 6B. For example, the piston 512 may be retracting, but the controller seeks to slow the piston 512 down to ultimately stop it. In this example, fluid in the chamber 516 may be regenerated into the hydraulic supply line 520 via the hydraulic line 524 and the opening 610. Fluid may also be drawn from the hydraulic return line 526 through the opening 612 and the hydraulic line 522 into the chamber 514 to prevent cavitation of the chamber 514.

Figure 7A:
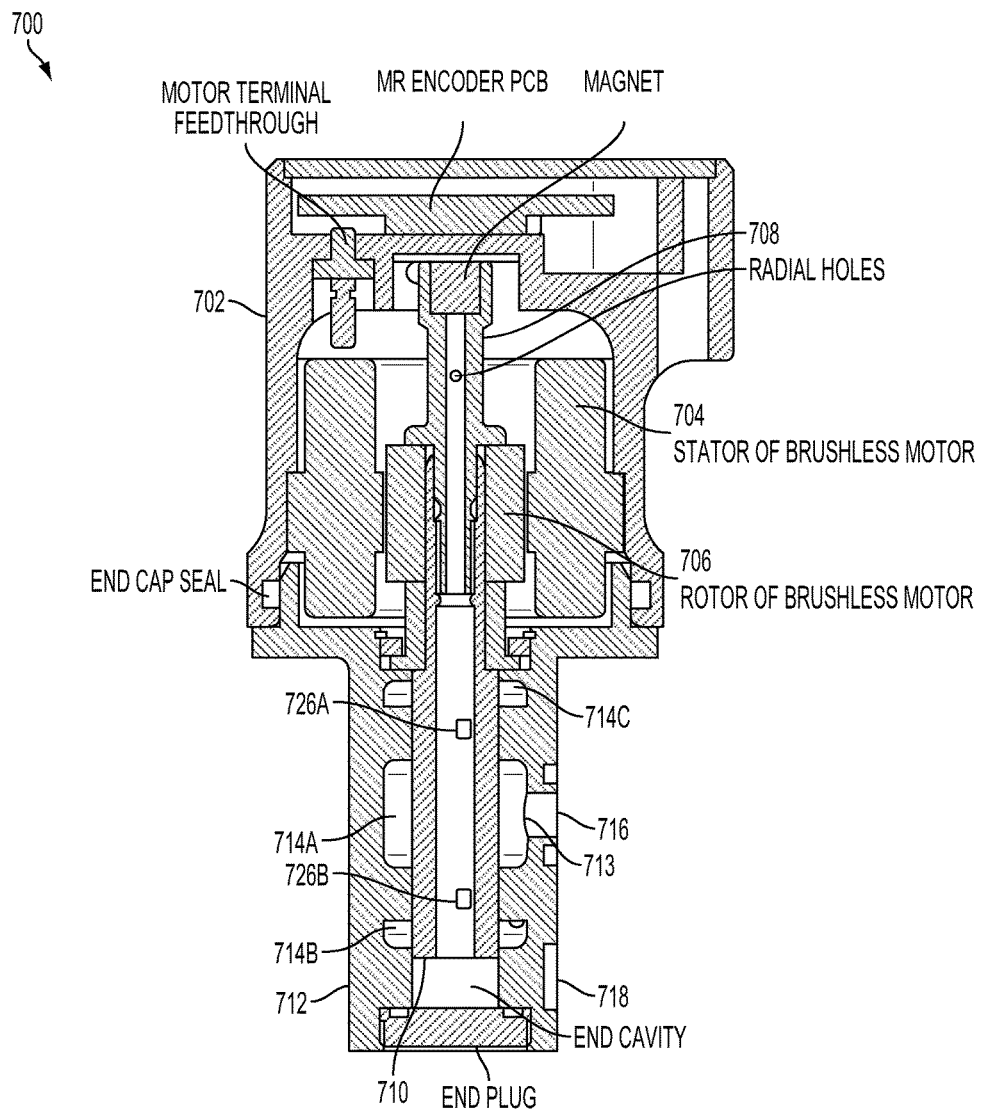
FIG. 7A illustrates a cross section of a rotary valve, in accordance with an example implementation.

FIGS. 7A-7E illustrate another valve configuration that can be used to implement the valve system 500. FIG. 7A illustrates a cross section of a rotary valve 700, in accordance with an example implementation. The valve 700 is a manifold style four-way valve. The rotary valve 700 may include a housing or end cap 702 that houses a rotary actuator such as a brushless direct current (DC) motor including a stator 704 and a rotor 706. A rotor bolt 708 is coupled to and configured to rotate with the rotor 706. A spool 710 is coupled to and configured to rotate with the rotor 706.

The spool 710 is rotatable within a valve body or sleeve 712. "Valve body" and "Sleeve" are used interchangeably herein. The sleeve 712 may have a plurality of openings such as opening 713 configured along a length of the sleeve 712. The openings may be disposed in annular grooves such as annular grooves 714A, 714B, and 714C. The openings may be arranged axially along the sleeve 712.

Figure 7B:
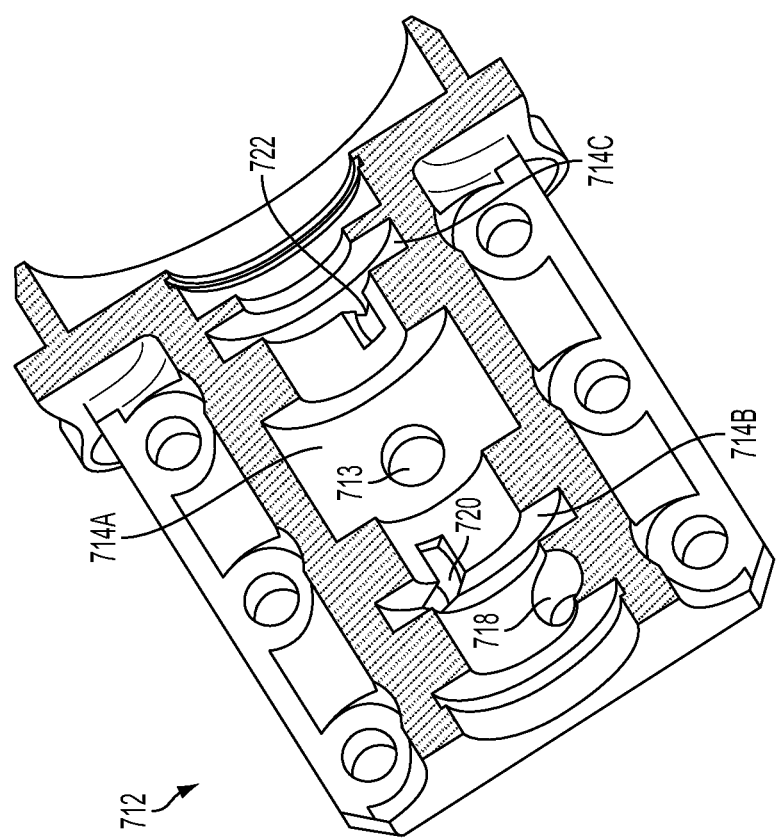
FIG. 7B illustrates a cross section of a valve body or sleeve of the valve illustrated in FIG. 7A, in accordance with an example implementation.

FIG. 7B illustrates a cross section of the valve body or sleeve 712, in accordance with an example implementation. As shown in FIG. 7B, the sleeve 712 may include the opening 713 associated with the annular groove 714A. The opening 713 may be configured to receive pressurized fluid from a hydraulic supply line at a port 716 shown in FIG. 7A.

The sleeve 712 may also include a return port 718. The return port 718 may be configured to communicate fluid to a low pressure reservoir or tank. The sleeve 712 may further include an opening 720 configured to communicate fluid through the annular groove 714B to and from a first chamber, e.g., the chamber 516, of the hydraulic actuator cylinder 502. The sleeve 712 may further include an opening 722 configured to communicate fluid through the annular groove 714C to and from a second chamber, e.g., the chamber 514, of the hydraulic actuator cylinder 502. The openings 720 and 722 may be referred to as T-slots because they form T-shaped openings with the annular grooves 714B and 714C, respectively.

The opening 720 may have a corresponding opening on the other side of the sleeve 712, and the opening 722 may have a corresponding opening on the other side of the sleeve 712. In this manner, the openings 720 and 722 and their corresponding openings form an array of openings that balances radial pressure forces acting on the spool 710, and thus minimizes friction that the spool 710 experiences as the spool 710 rotates within the sleeve 712. In one example, the openings 720 and 722 and the corresponding openings may be 180° opposed. In another example, three openings may be disposed along the circumference of the spool 710 space 120° apart from each other. Other examples are possible. Reference herein to one of these openings (e.g., the opening 720 or 722) includes reference to the opening and the corresponding opening(s) on the other side of the sleeve 712.

Figure 7C:
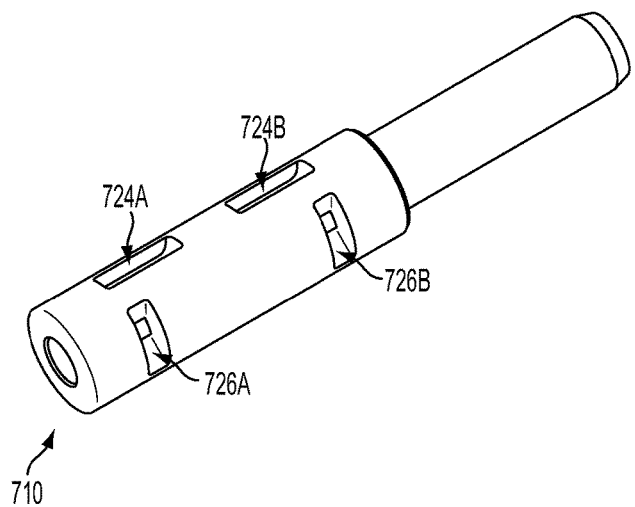
FIG. 7C illustrates a spool of the valve illustrated in FIG. 7A, in accordance with an example implementation.

The spool 710 shown in FIG. 7A may include a respective plurality of openings along a length of the spool 710 corresponding to the plurality of openings of the sleeve 712. FIG. 7C illustrates the spool 710, in accordance with an example implementation. As shown in FIG. 7C, the spool 710 could be hollow, and may have openings such as axial grooves 724A and 724B and windows 726A and 726B. On the other side of the spool 710 that is not shown in FIG. 7C, the spool 710 may also include axial grooves and windows. For example, the spool 710 may include windows corresponding to the windows 726A and 726B and located at an opposite side (e.g., 180° apart not shown in FIG. 7C) of the spool 710 from the windows 726A and 726B. In examples, multiple windows similar to the windows 726A and 726B may be disposed along the circumference of the spool 710. For example, N windows such as the window 726A may be disposed along the circumference of the spool 710 spaced 360°/N apart from each other. Also, the spool 710 may include axial grooves corresponding to the axial grooves 724A and 724B and located at an opposite side of the spool 710 from the axial grooves 724A and 724B. Having axial grooves and windows in such arrangement may help balance forces applied on the spool 710 by hydraulic fluid during operation of the valve 700. Reference herein to a window of the windows 726A and 726B includes reference to the windows 726A or 726B shown in FIG. 7C and the corresponding window (or array of windows disposed along the circumference of the spool 710, i.e., disposed in a circular manner about a longitudinal axis of the spool) on the other side of the spool 710 not shown in FIG. 7C. For instance, reference to the window 726A includes reference to the window 726A and the corresponding window on the other side of the spool 710 that is not shown in FIG. 7C. Similarly, reference herein to an axial groove of the axial grooves 724A and 724B includes reference to the axial groove 724A or 724B and the corresponding axial groove on the other side of the spool 710.

The rotary actuator (e.g., motor) coupled to the spool 710 may be configured to rotate the spool 710 within the sleeve 712 in a clockwise or a counter-clockwise direction. Rotating the spool 710 to a given position or angle may cause at least a partial alignment between the grooves and windows of the spool 710 with the openings (e.g., the annular groove 714A and the T-slots 720 and 722) of the sleeve 712.

Figure 7D:
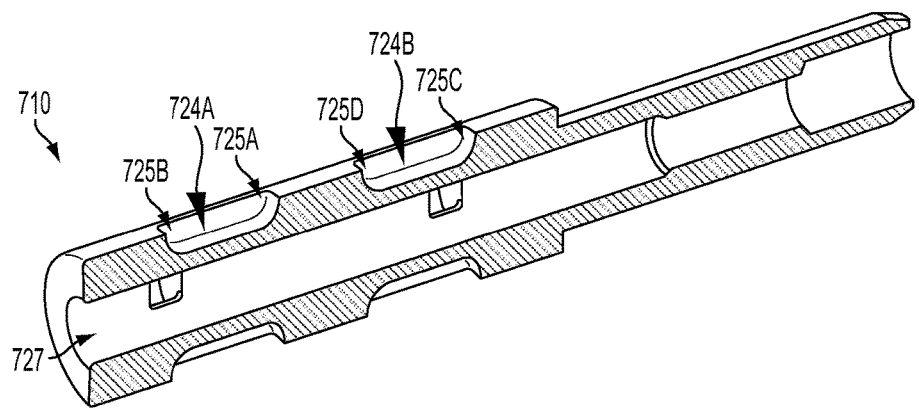
FIG. 7D illustrates a cross section of the spool illustrated in FIG. 7C, in accordance with an example implementation.

FIG. 7D illustrates a cross section of the spool 710, in accordance with an example implementation. The spool 710 is hollow and has inner chamber 727. As shown in FIG. 7D, the axial grooves 724A and 724B are not through-holes and do not reach the inner chamber 727 of the spool 710. The axial groove 724A has a first end 725A and a second end 725B, and the axial groove 724B has a first end 725C and a second end 725D. The groove 714A (shown in FIGS. 7A and 7B) overlaps the first end 725A of the axial groove 724A, and overlaps the second end 725D of the axial groove 724B. In this configuration, the axial grooves 724A and 724B contain, or have access to, pressurized fluid received through the opening 713 and the groove 714A in the sleeve 712.

Figure 7E:
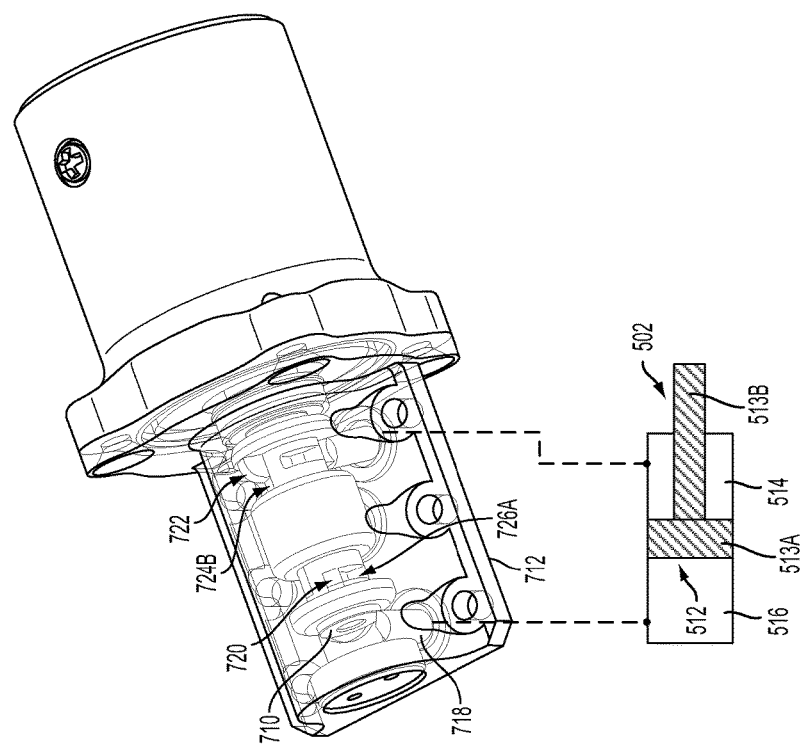
FIG. 7E illustrates the valve illustrated in FIGS. 7A-7D with the valve body made transparent, and while the spool is in a given rotary position/angle, in accordance with an example implementation.

FIG. 7E illustrates the valve 700 while the spool 710 is in a given rotary position/angle, in accordance with an example implementation. The valve body or sleeve 712 is shown transparent in FIG. 7E to illustrate the details of the spool 710 and the sleeve 712.

In the given rotary position, fluid received from the hydraulic supply line through the port 716 and the groove 714A in the sleeve 712 is communicated to the axial grooves 724A (specifically, the first end 725A) and 724B (specifically, the second end 725D). While the spool 710 is in the given rotary position, the first end 725C of the axial groove 724B may be aligned, at least partially, with the T-slot 722 in the sleeve 712. The fluid is thus communicated through the T-slot 722 through the annular groove 714C to the chamber 514 of the hydraulic actuator cylinder 502 to push the piston 512 to the left (i.e., to retract the piston 512). Thus, alignment between the axial groove 724B with the T-slot 722 form an opening that corresponds to the orifice 504 of the valve system 500.

Further, at the given rotary position of the spool 710, fluid that is forced out of the chamber 516 is communicated through T-slot 720 in the sleeve 712, which may be at least partially aligned with the window 726A in the spool. Fluid going through the window 726A is communicated through the inner chamber 727 of the spool 710, through the return port 718 (shown in FIGS. 7A and 7B) of the sleeve 712, to the reservoir or tank. Thus, alignment between the T-slot 720 and the window 726A form an opening that corresponds to the orifice 508 of the valve system 500. In a similar manner, rotating the spool 710 to a different rotary position can cause the spool 710 and the sleeve 712 to form openings corresponding to the orifice 506 and the orifice 510 of the valve system 500.

The valve configurations shown in FIGS. 6A-6B and 7A-7D are example configurations for illustration only, and other valve configurations are contemplated that can realize or implement the valve system 500. For example, four separate valves can be used to function as the respective orifices 504, 506, 508, and 510. Such a configuration may be referred to as a separate or independent metering configuration because each orifice can be controlled independently.

V. EXAMPLE CONTROL SYSTEM

Figure 8:
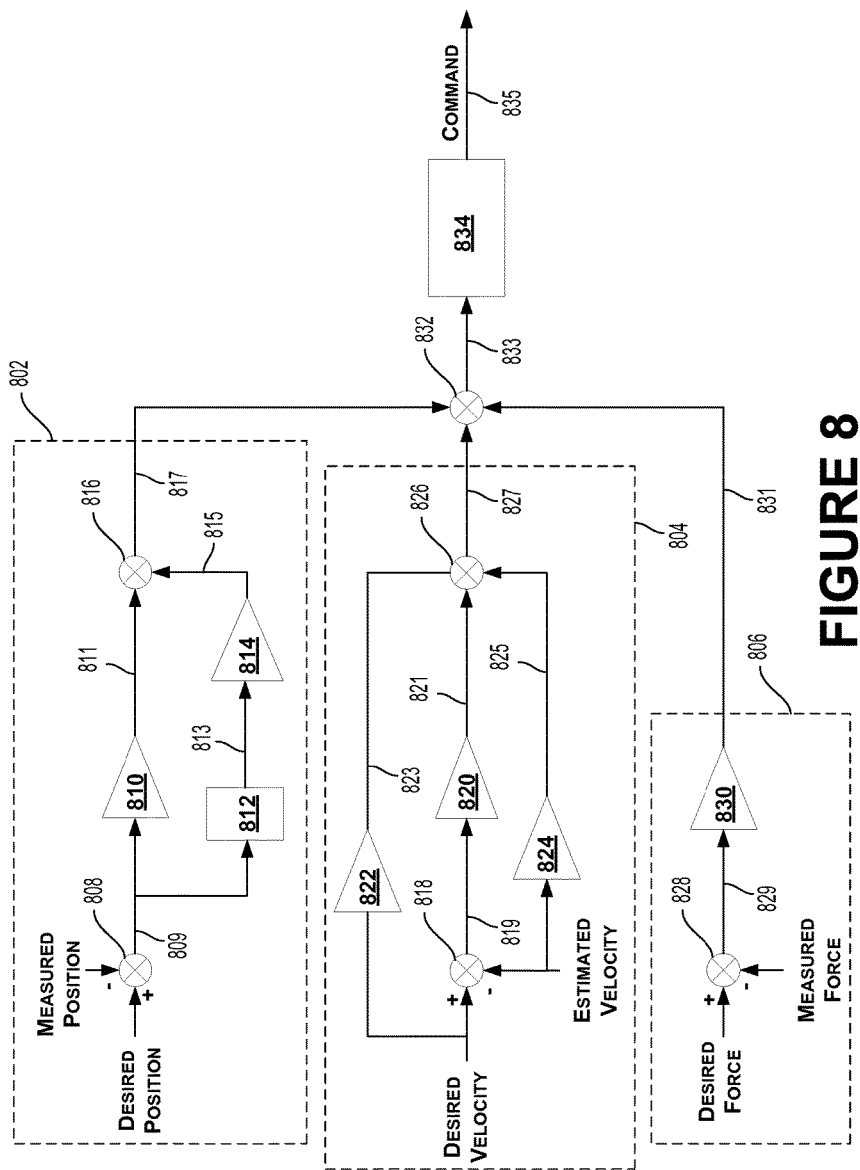
FIG. 8 illustrates a valve control system, in accordance with an example implementation.

FIG. 8 illustrates a valve control system 800, in accordance with an example implementation. The valve control system 800 may, for example, be implemented by the controller 108 described in FIG. 1 to control any of the valve systems described in FIGS. 5-7E. As FIG. 8 shows, the valve control system 800 may include three control loops, a position control loop 802, a velocity control loop 804, and a force control loop 806.

The position control loop 802 is configured to generate a command based on a difference between a desired position for the piston 512 of the hydraulic actuator cylinder 502 and a measured position of the piston 512. For instance, a position sensor may be coupled to the piston 512 (e.g., coupled to the piston head 513A or the rod 513B) and may be configured to provide information indicative of a position of the piston 512 to the controller 108. The difference is determined at junction 808 and represents a position error 809. The position error 809 is gain adjusted by a proportional gain 810 to form an adjusted signal 811. Also, the position error 809 is integrated at block 812 to form integrated error signal 813, which is gain adjusted by a proportional gain 814 to form an adjusted signal 815. The signal 811 and the signal 814 are summed at summation junction 816 to form signal 817.

The velocity control loop 804 is configured to generate a command based on a difference between a desired velocity for the piston 512 and a measured or estimated velocity of the piston 512. In an example, a velocity sensor may be coupled to the piston 512 (e.g., coupled to the piston head 513A or the rod 513B) and may be configured to provide information indicative of a velocity of the piston 512 to the controller 108. In another example, the controller 108 may be configured to estimate the velocity of the piston 512 by determining a derivative of the measured position of the piston 512 obtained from the position sensor coupled of the piston 512. The velocity difference is determined at junction 818 and represents a velocity error 819. The velocity error 819 is gain adjusted by a proportional gain 820 to form an adjusted signal 821. Also, the desired velocity is gain adjusted by a feedforward gain 822 to form signal 823. The estimated velocity is gain adjusted by a proportional gain 824 to form an adjusted signal 825. The signal 821, the signal 823, and the signal 825 are summed at summation junction 826 to form signal 827.

The force control loop 806 is configured to generate a command based on a difference between a desired force to be applied by the piston 512 to an external environment and a measured force of the piston 512. In an example, a force sensor (e.g., load cell) may be coupled to an end of the rod 513B and may be configured to provide information indicative of a force experienced by the piston 512 to the controller 108. The force experienced by the piston 512 is indicative of (i.e., a reaction to) the force applied by the piston 512 to the external environment.

In another example, pressure sensors may be coupled to the chambers 514 and 516 of the hydraulic actuator 502. The controller 108 may be configured to determine the force applied by the piston 512 based on information received from the pressure sensors. For example, assuming that the pressure in the chamber 516 is $P_C$, the pressure in the chamber 514 is $P_R$, an area of the piston head 513A is $A_C$, and a cross section area of the rod 513B is $A_{rod}$, the force applied by the piston 512 assuming the piston 512 is retracting (i.e., the chamber 516 is contracting and the chamber 514 is expanding) can be estimated by the following equation:

$$\text{Force} = P_R(A_C - A_{rod}) - P_C A_C \quad (2)$$

where $A_C - A_{rod}$ represents an annulus area of the piston 512 in the chamber 514. If the piston 512 is extending (i.e., the chamber 514 is contracting and the chamber 516 is expanding), the force applied by the piston to the external environment can be estimated by the following equation:

$$\text{Force} = P_C A_C - P_R(A_C - A_{rod}) \quad (3)$$

The force difference is determined at junction 828 and represents a force error 829. The force error 829 is gain adjusted by a proportional gain 830 to form an adjusted signal 831.

The signal 831 generated by the force control loop 806, the signal 827 generated by the velocity control loop 804, and the signal 817 generated by the position control loop 802 are summed at summation junction 832 to form signal 833. The signal 833 may be limited by a slew rate limiter block 834, which defines a maximum rate of change for the signal 833. The slew rate limiter block 834 may thus prevent sudden changes to the signal sent to the valve (e.g., to the solenoid controlling position of the spool 602 or the rotary actuator controlling the rotary position of the spool 710). In this manner, motion of the piston 512 may be smooth and might not exhibit jerky behavior. If the rate of change of the signal 833 does not exceed the maximum rate of change defined by the slew rate limiter block 834, the signal 833 is not modified by the slew rate limiter block 834. Command 835 may thus be the same as the signal 833 or may represent a modification of the signal 833 by the slew rate limiter block 834. The command 835 is then communicate to an actuator of the valve system 500. For instance, the command 835 may actuate a solenoid to move the spool 602, or actuate the rotary actuator that to move the spool 710 to a particular rotary position. Therefore, the command 835 controls which of the orifices 504, 506, 508, and 510 opens and a respective degree of opening. If each of the four orifices 504, 506, 508, and 510 is controlled independently, the command 835 may comprise a set of at least two signals that actuate two respective orifices.

The control structure shown in FIG. 8 provides for tracking a trajectory (i.e., position and velocity) while being responsive to unexpected forces. For instance, while the robot operates, a member (e.g., a leg) of the robot may hit an object in the environment (e.g., the ground) or inadvertently hit another part of the robot. Hitting an object or another member of the robot may cause an unexpected disturbance to the member of the robot. Having the force feedback reduces the force applied to the object by the robot. For example, when the object is the ground, the disturbance from the impact between the member of the robot and the ground is lessened. In the example, where the member hits another member, force feedback may prevent damage to either member.

The control structure shown in FIG. 8 also provides for managing the energy that is contained in the compressed hydraulic fluid and in the robot member. The compressed hydraulic fluid, and the robot member store energy during operation of the robot. A sudden large command to a valve controlling a hydraulic actuator of the member may cause underdamped oscillations in the hydraulic actuator force and velocity. Having force feedback helps dampen out these oscillations.

The control loops 802, 804, and 806 are examples for illustration only, and other control strategies may be implemented to provide a signal to a given valve and control the hydraulic actuator cylinder 502. Further, in some examples, not all the components of the control structure illustrated in FIG. 8 may be active at a given point in time. Based on a condition of the hydraulic actuator cylinder 502 and condition of an object (e.g., member of a robot) controlled by the hydraulic actuator cylinder 502, some components may be active and others may not be active.

VI. EXAMPLE IMPLEMENTATIONS FOR BRAKING AND REGENERATION CONTROL

Discussed herein is an example implementation of braking or regeneration control. The description refers to the valve system 500 as a representative system. Thus, the control methodology described herein can be implemented using the valve systems described above in FIGS. 6A-7E or any other valve system that can implement the valve system 500.

In an example implementation, assume that piston 512 controls motion of a robot member associated with a leg (e.g., one of legs 204a-204d) of the robot such that retraction of piston 512 corresponds to backward swinging of the leg, and extension of piston 512 corresponds to swinging the leg forward. During motion of the robot, the leg goes through the phases of lifting off of the ground, swinging backward, slowdown and stopping, then swinging forward.

Figure 9:
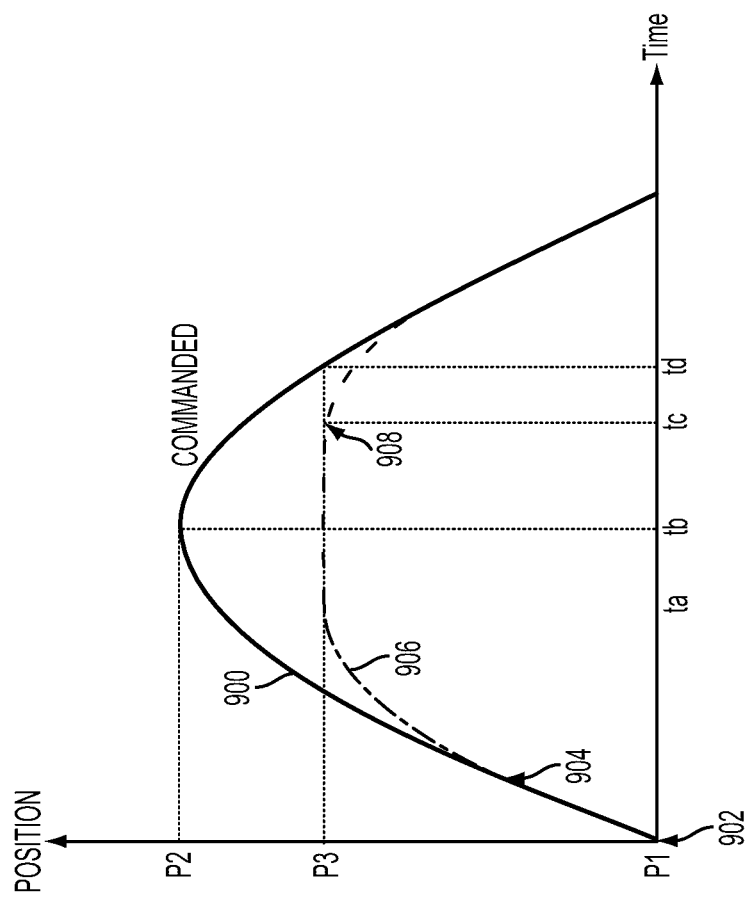
FIG. 9 illustrates regeneration control, in accordance with an example implementation.

FIG. 9 illustrates regeneration control, in accordance with an example implementation. The controller of the robot may be configured to determine a trajectory 900 for the piston 512 to correspond to phases of leg motion (i.e., lifting off of the ground, swinging backward, slowdown and stopping, then swinging forward). The trajectory 900 can be a commanded position trajectory to be input as the desired position to the position control loop 802, for example. Particularly, the trajectory 900 indicates that the piston 512 should move in a forward direction (e.g., extend) from a first position P1 until the piston 512 stops at a second position P2, then move in a reverse direction (e.g., retract). The trajectory 900 indicates that the piston 512 should return to the first position P1 position as an example. In other examples, the trajectory 900 may indicate that the piston 512 should return to a different position.

The trajectory 900 can be referred to as a predetermined or proposed trajectory 900 that the piston 512 should follow so as to cause the leg, and thus the robot, to move in a particular manner (e.g., walk, trot, gallop, etc.). However, by having advanced knowledge of the trajectory 900, the controller may modify the trajectory 900 to control the hydraulic system of the robot more efficiently.

The controller may be configured to provide a first signal at point 902 to the valve system 500 so as to move piston 512 based on the trajectory 900 (e.g., to follow the trajectory 900). For instance, the first signal may cause the orifice 506 and the orifice 510 to open, while the orifice 504 and the orifice 508 remain closed. That way, hydraulic fluid flows from the pressure source 518 through the hydraulic supply line 520, the orifice 506, and the hydraulic line 524 to the chamber 516. Hydraulic fluid flow into the chamber 516 pushes against the piston head 513A of the piston 512, causes the piston 512 to extend (move in the forward direction), and causes the chamber 516 to expand. Extension of the piston 512 causes the chamber 514 to contract, and forces hydraulic fluid out from the chamber 514 through the hydraulic line 522 and the orifice 510 through the hydraulic return line 526 to the reservoir 528. In the case that the orifice 506 and the orifice 510 can be controlled independently, the first signal may include a set of signals (i.e., two signals, one for each of the orifice 504 and the orifice 508).

Then, when the piston is at a position between the first position P1 and the second position P2, while moving in the forward direction, the controller may provide a second signal at point 904 to the valve system 500. This second signal causes the piston 512, while moving in the forward direction, to override the trajectory 900 and stop at a third position P3 disposed between the first position P1 and the second position P2. For example, the second signal may open the orifice 504 and the orifice 508, while closing the orifice 506 and the orifice 510. Alternatively, the controller may provide the second signal to open the orifice 510 and the orifice 508, while closing the orifice 506 and the orifice 504. In this manner, kinetic energy of the piston 512 is used to push fluid within the chamber 514 into the hydraulic supply line 520 or the hydraulic return line 526, and no fluid is consumed from hydraulic supply line 520. The piston 512 slows down and stops due to dissipation of its kinetic energy through pushing fluid of chamber 514 through the orifice 504 or the orifice 510. In the case that the orifice 504 (or the orifice 510) and the orifice 508 can be controlled independently, the second signal may include a set of signals i.e., two signals, one for each orifice.

As depicted in FIG. 9, overriding the trajectory 900 by the second signal causes the piston 512 to follow a modified trajectory 906. As shown by the modified trajectory 906, the piston 512 slows down and stops at the third position P3 at a time 'ta' quicker than if the piston 512 had followed the proposed trajectory 900 and stopped at position the second position P2 at time 'tb.' The piston 512 remains stopped at position P3 between time 'ta' and time 'tc.' While the piston 512 is stopped, all four orifices 504, 506, 508, and 510 may remain closed.

At time 'tc' (i.e., prior to time 'td' when the piston 512 would have reached the third position if the piston was moving in the reverse direction according to the trajectory 900), the controller may provide a third signal at point 908 in the modified trajectory 906 (i.e., at 'tc') to the valve system 500 so as resume moving the piston 512 based on the trajectory 900. In this manner, the controller hands off the piston 512 from the modified trajectory 906 to the trajectory 900 such that the piston 512 resumes following the trajectory 900 in the reverse direction. For instance, the third signal may cause the orifice 504 and the orifice 508 to open, while the orifice 506 and the orifice 510 remain closed. That way, hydraulic fluid flows from the pressure source 518 through the hydraulic supply line 520 and the orifice 504. The hydraulic fluid then flows through the hydraulic line 522 to the chamber 514, and pushes against the piston head 513A of the piston 512, which causes the piston 512 to retract, and causes the chamber 514 to expand. Retraction of the piston 512 causes the chamber 516 to contract, and forces hydraulic fluid out from the chamber 516 through the hydraulic line 524 and the orifice 508 through the hydraulic return line 526 to the reservoir 528. In the case that the orifice 504 and the orifice 508 can be controlled independently, the third signal may include a set of signals i.e., two signals, one for each orifice. In examples, the third signal may be applied at any time between times 'tb' and 'td.'

Figure 10:
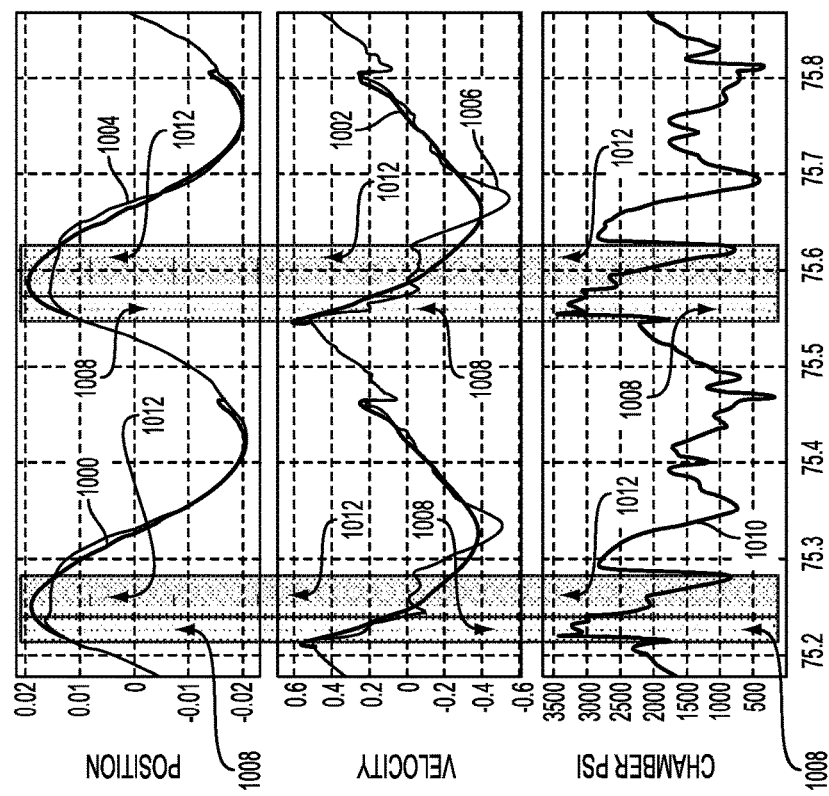
FIG. 10 illustrates commanded position and velocity of a piston, and chamber pressure, in accordance with an example implementation.

FIG. 10 illustrates commanded position and velocity of a piston, and chamber pressure, in accordance with an example implementation. Data shown in FIG. 10 represent experimental results from a robot similar to the robots 200, 300, and 400. Line 1000 represents commanded positions for a piston, e.g., the piston 512. The commanded position represents a predetermined or proposed trajectory similar to the trajectory 900 described above with respect to FIG. 9. Line 1002 represents commanded velocity for the piston.

Line 1004 depicts measured position, which represents a modified trajectory as described above with respect to FIG. 9. Line 1006 depicts measured velocity as the piston follows the modified trajectory. Shaded areas 1008 represents portions of a cycle where the piston is slowing down to ultimately stop, and the hydraulic actuator cylinder is in regeneration mode. For instance, referring to FIG. 5, the shaded areas 1008 represents portions of the cycle where the piston 512 is extending and the controller commands the piston 512 to slow down and stop by opening the orifice 504 and the orifice 508. That way, high pressure hydraulic fluid is pushed out of the chamber 514 into the hydraulic supply line 520, and thus the hydraulic actuator cylinder 502 is regenerating or adding energy to the system instead of consuming energy. Line 1010 represents hydraulic fluid pressure in the chamber 514 in psi. In the shaded areas 1008, the pressure in the chamber 514 is higher than the pressure of fluid in the hydraulic supply line, which is 3000 psi in this particular example, indicating that fluid is pushed out from the chamber 514 into the hydraulic supply line 520.

Shaded areas 1012 represents portions of the cycle after the piston 512 had deviated from the commanded trajectory 1000 and stopped. In the shaded areas 1012, the controller is waiting for the commanded trajectory 1000 to reach a current position of the piston 512 had the piston 512 followed the commanded trajectory 1000. As the commanded trajectory 1000 reaches the current position of the piston 512, the controller commands the valve system 500 so as to allow the piston 512 to resume following the commanded trajectory 1000.

In examples, if the trajectory 900 is aggressive, and thus requiring that the piston 512 move fast between the first position P1 and the second position P2 and quickly reverse direction, the piston 512 may slow down in response to the second signal but may not come to a complete stop. Thus, in these examples, the third signal may cause the piston 512 to resume following the trajectory 900 before the piston 512 stops.

VII. EXAMPLE METHODS

Figure 11:
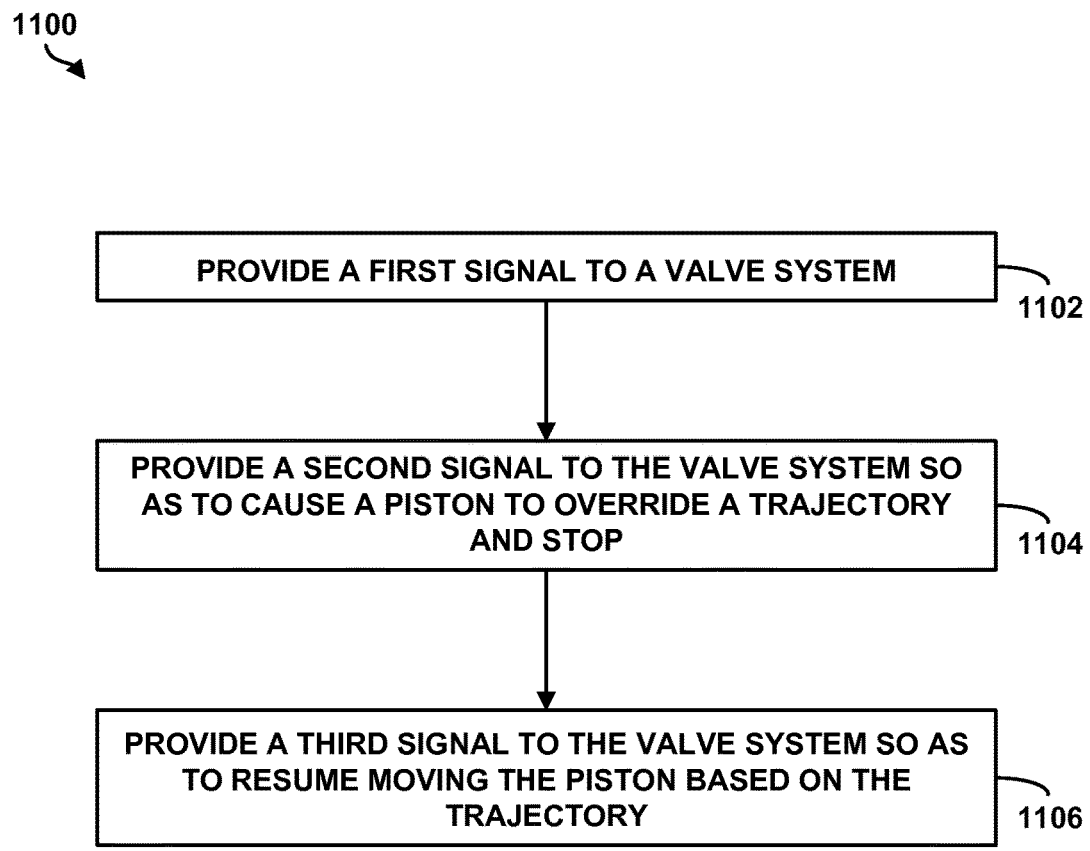
FIG. 11 is a flow chart illustrating operations for braking and regeneration control, in accordance with an example implementation.

FIG. 11 is a flow chart 1100 illustrating operations for braking and regeneration control, in accordance with an example implementation. The flow chart 1100 may include one or more operations, or actions as illustrated by one or more of blocks 1102-1106. These operations can be implemented in the context of the robotic system 100, and the robot 200, 300, and 400 by any of the controllers described above in the context of FIGS. 1-10 (e.g., the controller 108, 202, etc.).

Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, the flow chart 1100 shows operation of one possible implementation of present implementations. In this regard, each block may represent a module, a segment, or a portion of program code, which includes one or more instructions executable by a processor or a controller for implementing specific logical operations or steps in the process. The program code may be stored on any type of computer readable medium or memory, for example, such as a storage device including a disk or hard drive. The computer readable medium may include a non-transitory computer-readable medium, for example, such as computer-readable media that stores data for short periods of time like register memory, processor cache and Random Access Memory (RAM). The computer-readable medium may also include non-transitory media or memory, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, a tangible storage device, or other article of manufacture, for example. The computer-readable medium, the processor, the program code may all be included within a controller of a valve. In addition, each block in FIG. 11 may represent circuitry that is wired to perform the specific logical operations in the process.

At block 1102, a controller of a robot provides a first signal to a valve system. In line with the discussion above, the robot includes a hydraulic actuator cylinder such as the hydraulic actuator cylinder 502 controlling motion of a member of the robot. The hydraulic actuator cylinder includes a piston (e.g., the piston 512), a first chamber (e.g., the chamber 516), and a second chamber (e.g., the chamber 514). The valve system (e.g., the valve system 500) is configured to control hydraulic fluid flow between a hydraulic supply line (e.g., the hydraulic supply line 520) of pressurized hydraulic fluid, the first and second chambers, and a hydraulic return line (e.g., the hydraulic return line 526).

The controller provides the first signal to the valve system so as to cause the piston to move the piston based on a trajectory. For instance, referring to FIG. 5, the first signal may open the orifice 506 and the orifice 510 so as to connect the chamber 516 to the hydraulic supply line 520 and connect the chamber 514 to the hydraulic return line 526 such that hydraulic fluid flows from the hydraulic supply line 520 to the chamber 516, and hydraulic fluid flows from the chamber 514 to the hydraulic return line 526 causing the piston 512 to move in the forward direction based on the trajectory. The trajectory indicates that the piston 512 should move in a forward direction from a first position until the piston stops at a second position, then move in a reverse direction.

Referring back to FIG. 11, at block 1104, when the piston is between the first position and the second position while moving in the forward direction, the controller provides a second signal to the valve system so as to cause the piston to override the trajectory and stop at a third position disposed between the first position and the second position. The controller may receive sensor information indicative of a pressure level in the second chamber and motion characteristics of the piston (speed, acceleration/deceleration, etc.). The controller may provide the second signal based at least on the pressure level in the second chamber and the motion characteristics of the piston. In an example, the controller may provide the second signal so as to connect the second chamber to the supply line and connect the first chamber to the return line such that hydraulic fluid flows from the second chamber into the supply line, and hydraulic fluid flows from the return line to the first chamber. In another example, the controller may provide the second signal so as to connect both the first chamber and the second chamber to the return line.

For instance, referring to FIG. 5, the second signal may open the orifice 504 and the orifice 508 so as to regenerate hydraulic fluid from the chamber 514 into the hydraulic supply line 520 until the piston 512 stops at the third position. Alternatively, the controller may provide the second signal to open the orifice 510 and the orifice 508 such that hydraulic fluid in the chamber 514 flows to the hydraulic return line 526 by way of the orifice 510 until the piston 512 stops at the third position. After the piston stops at the third position, all four orifices 504, 506, 508, and 510 may be closed to hold the piston 512 in place.

At block 1106, prior to when the piston would have reached the third position if the piston was moving in the reverse direction according to the trajectory, the controller provides a third signal to the valve system so as to resume moving the piston in the reverse direction based on the trajectory. For instance, the third signal may open the orifice 504 and the orifice 508 such that hydraulic fluid flows from the hydraulic supply line 520 to the chamber 514, and hydraulic fluid flows from the chamber 516 to the hydraulic return line 526 causing the piston 512 to move in the reverse direction based on the trajectory.

In the description above, forward direction and reverse direction refer to any two opposing directions of motion. For instance, the forward direction can refer to upward motion of the piston, and the reverse direction in this case refers to downward motion. Further, the hydraulic actuator described throughout the disclosure is a hydraulic actuator cylinder. However, the systems and methods described herein can be applied to a hydraulic motor (e.g., a mechanical actuator that converts hydraulic pressure and flow into torque and angular displacement/rotation) as well.

VIII. CONCLUSION

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A robot comprising:
   a hydraulic actuator cylinder controlling motion of a member of the robot, the hydraulic actuator cylinder comprising a piston, a first chamber, and a second chamber;
   a valve system configured to control hydraulic fluid flow between a supply line of pressurized hydraulic fluid, the first and second chambers, and a return line, the valve system configured to couple the first chamber to the supply line of pressurized fluid and couple the second chamber to the return line to move the piston in a forward direction; and
   a controller configured to:
      provide a first signal to the valve system to cause the piston to follow a desired trajectory, the desired trajectory indicating movement by the piston in the forward direction from a first position until the piston stops at a second position, then move in a reverse direction;
      when the piston is between the first position and the second position while moving in the forward direction:
         receive sensor information from a sensor system indicative of a speed of the piston and a pressure level in the second chamber; and
         provide a second signal to the valve system based on the speed of the piston and the pressure level in the second chamber, the second signal causing the piston to override the desired trajectory and stop at a third position disposed between the first position and the second position; and
      prior to when the piston would have reached the third position if the piston was moving in the reverse direction according to the desired trajectory, provide a third signal to the valve system to resume moving the piston in the reverse direction based on the desired trajectory.

2. The robot of claim 1, wherein the valve system is configured to couple the supply line to the second chamber, and couple the first chamber to the return line to move the piston in the reverse direction.

3. The robot of claim 1, wherein the controller is configured to provide the first signal to connect the first chamber to the supply line and connect the second chamber to the return line such that hydraulic fluid flows from the supply line to the first chamber, and hydraulic fluid flows from the second chamber to the return line causing the piston to move in the forward direction based on the desired trajectory.

4. The robot of claim 1, wherein the controller is configured to provide the second signal to connect the second chamber to the supply line and connect the first chamber to the return line such that hydraulic fluid flows from the second chamber into the supply line, and hydraulic fluid flows from the return line to the first chamber.

5. The robot of claim 1, wherein the controller is configured to provide the second signal to connect both the first chamber and the second chamber to the return line at the same time.

6. The robot of claim 1, wherein the controller is configured to provide the third signal to connect the second chamber to the supply line and connect the first chamber to the return line such that hydraulic fluid flows from the supply line to the second chamber, and hydraulic fluid flows from the first chamber to the return line causing the piston to move in the reverse direction based on the desired trajectory.

7. The robot of claim 1, wherein the controller is configured to provide the second signal to the valve system to cause the piston to follow a modified trajectory when moving in the forward direction until the piston stops at the third position.

8. The robot of claim 7, wherein the piston stops at the third position according to the modified trajectory earlier than the piston would have stopped at the second position if the piston had followed the desired trajectory.

9. The robot of claim 1, wherein the controller is configured to provide the third signal to the valve system to cause the piston to resume following the desired trajectory in the reverse direction.

10. A method comprising:
    providing, by a controller of a robot, a first signal to a valve system, wherein the robot includes a hydraulic actuator cylinder controlling motion of a member of the robot, the hydraulic actuator cylinder comprising a piston, a first chamber, and a second chamber, wherein the valve system is configured to control hydraulic fluid flow between a supply line of pressurized hydraulic fluid, the first and second chambers, and a return line, the valve system configured to couple the first chamber to the supply line of pressurized fluid and couple the second chamber to the return line to move the piston in a forward direction, wherein the first signal to the valve system causes the piston to follow a desired trajectory, the desired trajectory indicating movement by the piston in the forward direction from a first position until the piston stops at a second position, then move in a reverse direction;

when the piston is between the first position and the second position while moving in the forward direction:
receiving sensor information from a sensor system indicative of a speed of the piston and a pressure level in the second chamber; and
providing a second signal to the valve system based on the speed of the piston and the pressure level in the second chamber, the second signal causing the piston to override the desired trajectory and stop at a third position disposed between the first position and the second position; and prior to when the piston would have reached the third position if the piston was moving in the reverse direction according to the desired trajectory, providing a third signal to the valve system to resume moving the piston in the reverse direction based on the desired trajectory.

11. The method of claim 10, wherein providing the first signal comprises providing the first signal to connect the first chamber to the supply line and connect the second chamber to the return line such that hydraulic fluid flows from the supply line to the first chamber, and hydraulic fluid flows from the second chamber to the return line causing the piston to move in the forward direction based on the desired trajectory.

12. The method of claim 10, wherein providing the second signal comprises providing the second signal to connect the second chamber to the supply line and connect the first chamber to the return line such that hydraulic fluid flows from the second chamber into the supply line, and hydraulic fluid flows from the return line to the first chamber.

13. The method of claim 10, wherein providing the second signal comprises providing the second signal to connect both the first chamber and the second chamber to the return line at the same time.

14. The method of claim 10, wherein providing the third signal comprises providing the third signal to connect the second chamber to the supply line and connect the first chamber to the return line such that hydraulic fluid flows from the supply line to the second chamber, and hydraulic fluid flows from the first chamber to the return line causing the piston to move in the reverse direction based on the desired trajectory.

15. A non-transitory computer readable medium having stored therein instructions that, in response to execution by a controller of a robot, cause the controller to perform operations comprising:
providing a first signal to a valve system, wherein the robot includes a hydraulic actuator cylinder controlling motion of a member of the robot, the hydraulic actuator cylinder comprising a piston, a first chamber, and a second chamber, wherein the valve system is configured to control hydraulic fluid flow between a supply line of pressurized hydraulic fluid, the first and second chambers, and a return line, the valve system configured to couple the first chamber to the supply line of pressurized fluid and couple the second chamber to the return line to move the piston in a forward direction, wherein the first signal to the valve system causes the piston to follow a desired trajectory, the desired trajectory indicating movement by the piston in the forward direction from a first position until the piston stops at a second position, then move in a reverse direction;

when the piston is between the first position and the second position while moving in the forward direction:
receiving sensor information from a sensor system indicative of a speed of the piston and a pressure level in the second chamber; and
providing a second signal to the valve system based on the speed of the piston and the pressure level in the second chamber, the second signal causing the piston to override the desired trajectory and stop at a third position disposed between the first position and the second position; and prior to when the piston would have reached the third position if the piston was moving in the reverse direction according to the desired trajectory, providing a third signal to the valve system to resume moving the piston in the reverse direction based on the desired trajectory.

16. The non-transitory computer readable medium of claim 15, wherein providing the second signal comprises providing the second signal to the valve system to cause the piston to follow a modified trajectory when moving in the forward direction until the piston stops at the third position.

17. The non-transitory computer readable medium of claim 16, wherein the piston stops at the third position according to the modified trajectory earlier than the piston would have stopped at the second position if the piston had followed the desired trajectory.

18. The non-transitory computer readable medium of claim 16, wherein the operation of providing the third signal comprises providing the third signal to the valve system to cause the piston to resume following the desired trajectory in the reverse direction.

* * * * *